(12) United States Patent
Hottinen

(10) Patent No.: US 8,909,270 B2
(45) Date of Patent: Dec. 9, 2014

(54) AVOIDING INTERFERENCE IN COGNITIVE RADIO COMMUNICATIONS

(75) Inventor: Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 193 days.

(21) Appl. No.: 13/703,192

(22) PCT Filed: Jun. 23, 2010

(86) PCT No.: PCT/FI2010/050535
§ 371 (c)(1),
(2), (4) Date: Dec. 10, 2012

(87) PCT Pub. No.: WO2011/161300
PCT Pub. Date: Dec. 29, 2011

(65) Prior Publication Data
US 2013/0090141 A1    Apr. 11, 2013

(51) Int. Cl.
*H04B 15/00* (2006.01)
*H04W 72/12* (2009.01)
*H04W 24/00* (2009.01)
*H04W 28/04* (2009.01)
*H04W 28/18* (2009.01)

(52) U.S. Cl.
CPC ............ *H04B 15/00* (2013.01); *H04W 72/1231* (2013.01); *H04W 24/00* (2013.01); *H04W 28/04* (2013.01); *H04W 28/18* (2013.01)
USPC ........................................................ 455/501

(58) Field of Classification Search
CPC .. H04W 16/28; H04W 72/085; H04W 72/131
USPC ........................................................ 455/501
See application file for complete search history.

(56) References Cited

U.S. PATENT DOCUMENTS

| | | | | |
|---|---|---|---|---|
| 8,565,193 B2 * | 10/2013 | Ylitalo | ........................... | 370/334 |
| 2006/0084444 A1 | 4/2006 | Kossi et al. | | |
| 2008/0273515 A1 * | 11/2008 | Stopler et al. | ................ | 370/344 |
| 2009/0117914 A1 | 5/2009 | Kwon et al. | | |
| 2009/0325482 A1 | 12/2009 | Zhou et al. | | |
| 2010/0003922 A1 | 1/2010 | Zhou et al. | | |
| 2013/0021925 A1 * | 1/2013 | Yin et al. | ....................... | 370/252 |
| 2013/0028215 A1 * | 1/2013 | Gerlach et al. | ................ | 370/329 |
| 2013/0189932 A1 * | 7/2013 | Shen et al. | ....................... | 455/68 |
| 2013/0310058 A1 * | 11/2013 | Ibrahim et al. | ............. | 455/452.1 |

FOREIGN PATENT DOCUMENTS

EP     1942690 A2     7/2008

OTHER PUBLICATIONS

International Search Report and Written Opinion of PCT/FI2010/050535 dated Mar. 28, 2011.

* cited by examiner

*Primary Examiner* — Bobbak Safaipour
(74) *Attorney, Agent, or Firm* — Banner & Witcoff, Ltd.

(57) ABSTRACT

A method, apparatus, and computer program for cognitive radio communications are provided. A reference signal is received from a transmitter of a primary system, and the received reference signal is received with an arbitrarily selected beamforming setting. Then, a signal quality metric is calculated from the received and beamformed reference signal. If the signal quality metric indicates that a reception power of the received signal is low, transmission of a data signal to a wireless communication device of a secondary system is scheduled. In the scheduled transmission in the secondary system, the same beamforming setting as was used in the reception of the reference signal is employed.

20 Claims, 3 Drawing Sheets

1

AVOIDING INTERFERENCE IN COGNITIVE RADIO COMMUNICATIONS

FIELD

The invention relates to the field of radio telecommunications and, particularly, to avoiding interference in cognitive radio communications.

BACKGROUND

Recently, a field of cognitive radio communications has become an interesting topic in the development of future radio communication systems and networks. A cognitive radio communication device is capable of sensing a radio environment and adapting its communication parameters to the sensed environment. The sensing typically extends beyond conventional radio channel estimation and comprises sensing other users in the same radio spectrum. The other users may use the same or even different radio access technologies. The communication parameters are then adjusted so as to avoid interference towards/from other users.

BRIEF DESCRIPTION

According to an aspect of the present invention, there is provided a method comprising: receiving, in a wireless communication apparatus, a reference signal from a transmitter of a primary system through a radio channel in a radio communication resource; applying an arbitrarily selected reception beamforming setting to the received signal, wherein the arbitrarily selected beamforming setting is selected arbitrarily from a set comprising at least two beamforming settings; estimating a signal quality metric from the received signal to which the selected reception beamforming setting has been applied; scheduling transmission of a data signal in said radio communication resource to a wireless communication device of a secondary system with a transmission beamforming setting having the same beamforming parameters as the reception beamforming setting, wherein the scheduling is triggered when the estimated signal quality metric indicates a signal quality lower than a determined threshold.

According to another aspect of the present invention, there is provided an apparatus comprising: at least one processor; and at least one memory including a computer program code. The at least one memory and the computer program code are configured, with the at least one processor, to cause the apparatus to receive a reference signal from a transmitter of a primary system through a radio channel, wherein the signal is associated to a radio communication resource, to apply an arbitrarily selected reception beamforming setting to the received signal, wherein the arbitrarily selected beamforming setting is selected arbitrarily from a set comprising at least two beamforming settings, to estimate a signal quality metric from the received signal to which the arbitrarily selected reception beamforming setting has been applied, and to schedule transmission of a data signal in said radio communication resource to a wireless communication device of a secondary system with a transmission beamforming setting having the same beamforming parameters as the reception beamforming setting, wherein the scheduling is triggered when the estimated signal quality metric indicates a signal quality lower than a determined threshold.

According to yet another aspect of the present invention, there is provided a computer program product embodied on a non-transitory distribution medium readable by a computer and comprising program instructions which, when loaded into an apparatus, execute a computer process comprising: receiving a reference signal from a transmitter of a primary system through a radio channel in a radio communication resource; applying an arbitrarily selected reception beamforming setting to the received signal, wherein the arbitrarily selected beamforming setting is selected arbitrarily from a set comprising at least two beamforming settings; estimating a signal quality metric from the received signal to which the selected reception beamforming setting has been applied; scheduling transmission of a data signal in said radio communication resource to a wireless communication device of a secondary system with a transmission beamforming setting having the same beamforming parameters as the reception beamforming setting, wherein the scheduling is triggered when the estimated signal quality metric indicates a signal quality lower than a determined threshold.

Embodiments of the invention are defined in the dependent claims.

LIST OF DRAWINGS

Embodiments of the present invention are described below, by way of example only, with reference to the accompanying drawings, in which FIG. 1 illustrates a communication scenario to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
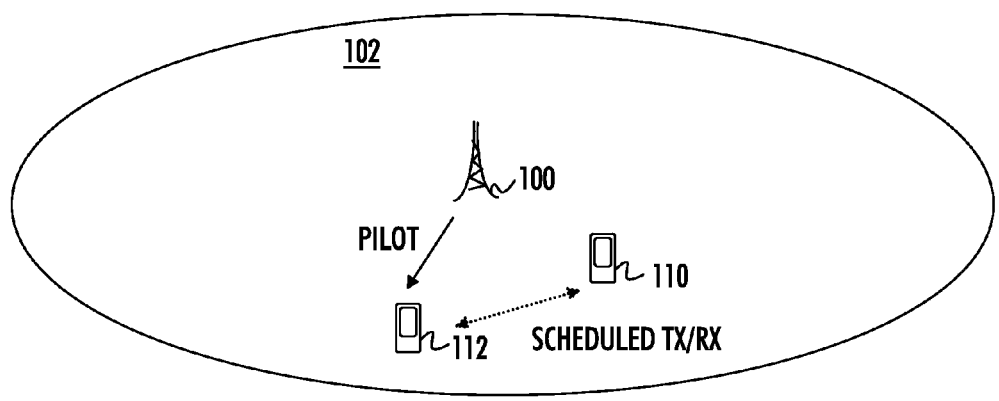

FIG. 1 illustrates a general cognitive radio communication scenario to which embodiments of the invention may be applied. As mentioned in the Background section, a cognitive radio communication device is capable of sensing a radio environment and adapting its communication parameters to the sensed environment. An example of cognitive radio communications is a scenario where two (or more) different systems operate on the same frequency band. One of the systems is a primary system having a priority with respect to the operation and performance. The other secondary system(s) adapt their communication parameters and radio resources to the requirements of the primary systems. In more detail, the devices of the secondary system(s) may select their communication parameters and resources such that interference towards the primary system is minimized or even negated. In FIG. 1, the primary system is represented by a base station 100 providing radio communication services in its coverage area 102 (cell). The secondary system is represented by user devices 110, 112 communicating with each other over a direct device-to-device communication link. One of the user devices 112 may be configured to communicate at least unidirectionally with the primary system, as illustrated in FIG. 1. The radio access schemes used by the primary and secondary systems depend on the implementation. The primary system may be, for example, a cellular telecommunication system based on GSM (Global System for Mobile Communications), UMTS (Universal Mobile Telecommunication System or its long-term evolution versions (LTE and LTE-Advanced), WiMAX (Worldwide Interoperability for Microwave Access), IEEE 802.11 (WiFi), or a radio broadcast system (video or audio broadcast system). The secondary system may utilize, for example, any one of the following radio access schemes: Bluetooth, IEEE 802.11, Zigbee, or a device-to-device extension of a cellular radio access scheme. The present invention is not limited to any particular radio access scheme, as long as the radio access scheme supports embodiments of the present invention.

Referring to FIG. 1, a first user device 112 is arranged to receive from the primary system 100 a pilot signal or a corresponding signal enabling signal quality estimation. On the basis of the signal quality estimated from the pilot signal, the first user device schedules communications between the user devices 110, 112. Embodiments of the invention may be implemented in the first user device 112 which may be any wireless communication device capable of cognitive radio communications according to embodiments of the invention. The wireless communication device may be a portable communications device such as a mobile phone, a computer, a laptop, etc. comprising radio transceiver circuitries, signal processing circuitries, and a user interface for displaying data transferred in the system of FIG. 1. In other embodiments, the wireless communication device is a wireless sensor or measurement equipment with wireless communication capability. The wireless communication device comprises a plurality of antenna elements (e.g. an antenna array) and a signal processing circuitry configured to realize beamforming or multi-antenna transmission, i.e. spatial selectivity, in transmission and reception. In other words, the signal processing circuitry weights amplitude and/or phases of signals coupled to the antenna elements the antenna array such that a transmission/reception radiation pattern becomes spatially weighted. Particularly, the signal processing circuitry may utilize random, pseudo-random, or multi-beam beamforming where the signal processing circuitry applies arbitrary, or more than one beamforming or antenna weighting settings, In random or pseudo-random beamforming, the beamforming settings are determined without information on channel conditions between the wireless communication device 112 and the primary system 100. The beamforming settings may be selected from a codebook of beamforming settings e.g. sequentially, according to a prescribed policy, or according to a pseudo-random pattern. Alternatively, the beams or beam coefficients (at least one coefficient per beam) may be determined separately in a pseudo-random manner. The beamforming setting may change as a function of time, e.g. between consecutive time slots and follow a preset pattern of beamforming settings. For example, a different beamforming setting can be selected from the codebook for different time slots and/or frequency slots (sub-channels). There are at least two beamforming settings, and the beamforming settings may be selected sequentially and repeated after some prescribed use, e.g. periodically. In an embodiment, the beamforming settings may determined randomly based on a random seed defining a beamforming setting of the codebook to be applied next.

Figure 2:
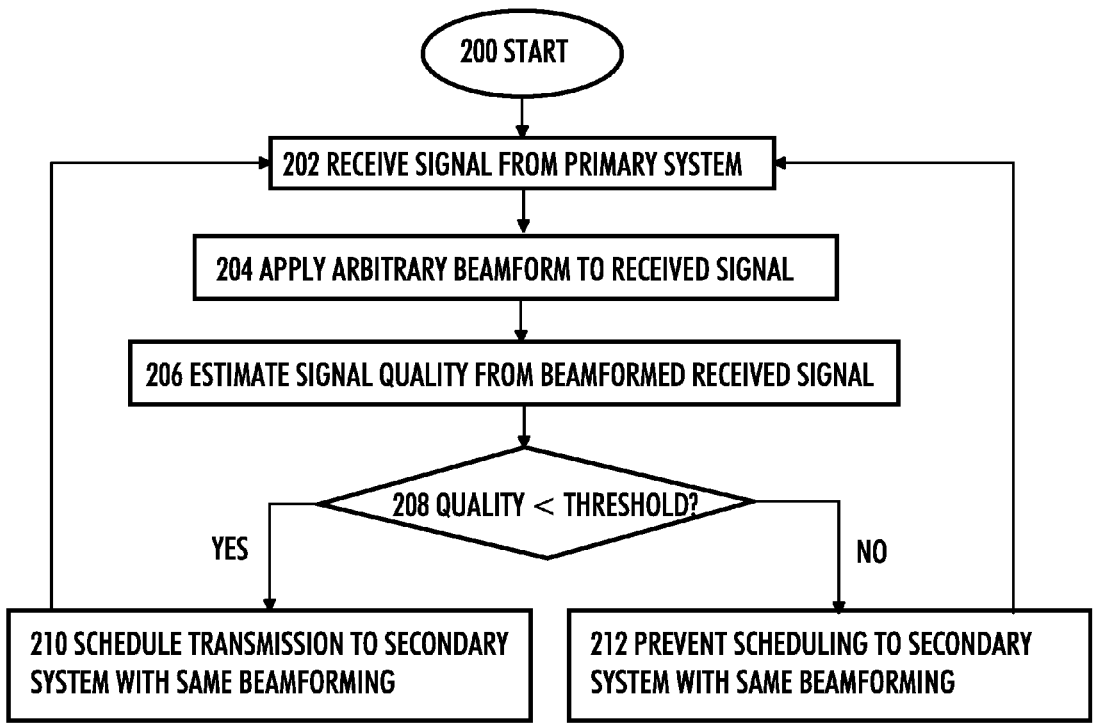
FIG. 2 is a flow diagram of a process for cognitive radio communications according to an embodiment of the invention.

FIG. 2 illustrates a method for scheduling transmissions in the secondary system. The method may be realized in an apparatus applicable to the first user device 112. The apparatus may be the first user device 112 or a functional entity comprised in the first user device, e.g. a processor configured by software comprising computer program blocks for carrying out the method of FIG. 2 or at least some of the steps of FIG. 2. Referring to FIG. 2, the process starts in block 200. In block 202, a signal is received from a transmitter of a primary system through a radio channel. In block 204, an arbitrarily selected reception beamforming setting is applied to the received signal. In block 206, a signal quality metric is estimated from the received signal to which the arbitrarily selected reception beamforming setting has been applied. In block 208, it is determined whether the estimated signal quality is above or below a predetermined threshold. If the estimated signal quality is below the determined threshold, it is assumed that the transmission in the secondary system will not interfere with the primary system, and the process proceeds to block 210. In block 210, transmission of a signal to a wireless receiver of the secondary system is scheduled. The same beamforming setting used in block 204 is now applied as a transmission beamforming setting having the same beamforming parameters as the reception beamforming setting. On the other hand, if the estimated signal quality is above the determined threshold, it is assumed that the transmission in the secondary system will interfere with the primary system, and the process proceeds to block 212. In block 212, the scheduling to the wireless receiver of the secondary system is prevented, i.e. the scheduling is not made.

The present invention may be used particularly when the radio channel is reciprocal, i.e. the signal quality estimated from the signal received from the primary (and possibly also secondary) system is proportional to (or correlates significantly with) the interference the transmission in the secondary system causes towards the primary system or a receiver that should be protected from interference. Utilization of the random beamforming in reception from the primary system and in transmission to the secondary system avoids the need for full channel knowledge, i.e. estimation of a channel state matrix between different transceivers, and it enables the device or transmitter to schedule transmissions in the secondary system such that interference towards the primary system is minimized. Additionally, the embodiments of the present invention enable sharing the radio resources with the primary system, if the interference towards the primary system is determined to be below the threshold level. As a result, spectral efficiency is improved, as the secondary system is not necessarily forced to restrict its transmissions to radio resources not currently used by the primary system.

Figure 3:
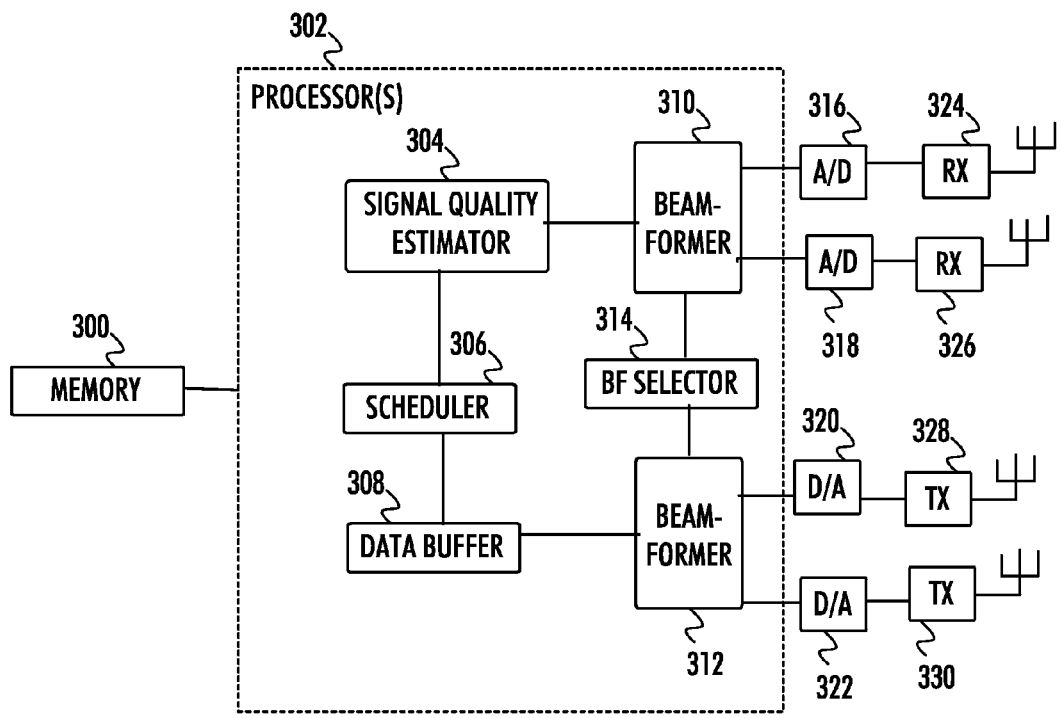
FIGS. 3 and 4 illustrate exemplary block diagrams of an apparatus according to embodiments of the invention.
Figure 4:
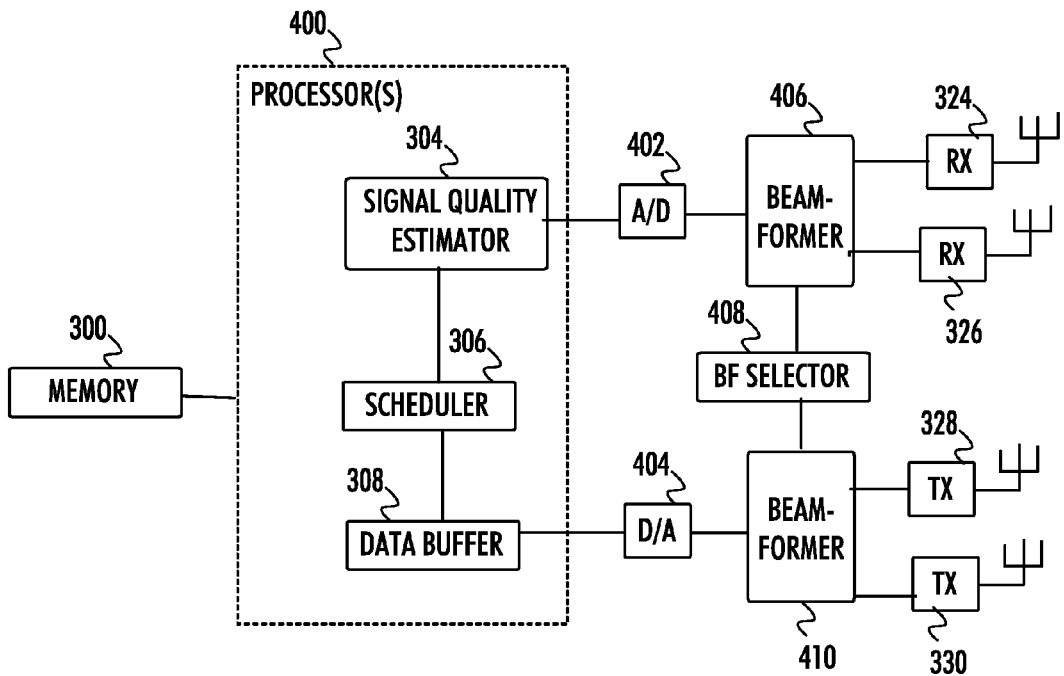

FIGS. 3 and 4 illustrate embodiments of the apparatus implementing the method described above with reference to FIG. 2. The apparatus may be comprised in a wireless communication device communicating in the secondary system. In the embodiment of FIG. 3, the random beamforming is made in a digital domain, while the embodiment of FIG. 4 performs the random beamforming in an analog domain. Referring to FIG. 3, the apparatus comprises a reception circuitry configured to receive from the primary system a signal enabling signal quality estimation. The signal may be a reference signal used in the primary system for channel estimation etc. When the primary system uses multiple frequency channels, the reference signal may be transmitted on a plurality of frequency channels (optionally in the same time slot) to enable the channel estimation for each frequency channel that the secondary system might transmit on. The reception circuitry in the apparatus according to an embodiment of the invention comprises a plurality of antennas in an antenna array, or a set of distributed antenna elements (possibly different elements using different polarization), and an analog reception circuitry 324, 326 for each antenna. The analog reception circuitries 324, 326 may perform radio frequency (RF) filtering, low-noise amplification, and frequency conversion to the baseband. The analog reception circuitries 324, 326 may also perform other functions typical for a radio receiver. The baseband signals are then applied to analog-to-digital (ND) converters 316, 318 for ND conversion. Digital samples of the signals are then applied to a beamformer 310. The reception chain contains separate branches from the antennas to the beamformer 310. The beamformer 310 combines the reception signal branches. Let us assume that a signal received at a given time slot in each branch has the following form at an input to the beamformer 310:

$$y_k = h_k x + n_k, \quad (1)$$

where $h_k$ represents a channel impulse response between the transmitter of the reference signal (primary system transmitter) in $k^{th}$ signal branch, x represents a transmitted reference signal, and $n_k$ represents noise in signal branch k. The beamformer 310 then applies a determined beamforming modification to the received signals. The beamformer 310 may modify the received signals by applying to each signal in the plurality of parallel branches a modification factor having the following form:

$$g_k[t] = \sqrt{p_k[t]} \exp(j\phi_k[t]), \quad (2)$$

where $p_k[t]$ is an amplitude in time slot t at $k^{th}$ signal branch, and $\phi_k[t]$ is a phase in time slot t at $k^{th}$ signal branch. The values of $p_k[t]$ and $\phi_k[t]$ are provided by a beamform selector 314 which may be configured to change the values of the $p_k[t]$ and $\phi_k[t]$ between consecutive time slots, sub-frames, and/or frames of the primary system according to a determined pattern which may be selected randomly or pseudo-randomly. In an embodiment utilizing the pseudo-random beamforming, the values for the modification factor are obtained for a given time slot e.g. from elements of a given column in a discrete Fourier matrix or another unitary matrix. For the subsequent time slot, elements of a subsequent column in the unitary matrix are used and so on. After the last column, the beamform selector may select the beamform from the first column. In such manner (or in any other manner), the beamform setting may be repeated in a cyclic manner. The modification factor of Equation (2) is applied to the received signal in the beamformer to yield:

$$y_{k,t} = g_k h_k x + g_k n_k = g_k h_k x + n_k. \quad (3)$$

After the weighting with the modification factor, the signals in the branches may be combined, e.g. summed, coherently so that corresponding signal samples in the parallel branches are summed together to obtain a single signal modified according to the beamforming pattern. The beamformed and combined reference signal is then applied to a signal quality estimator 304 arranged to estimate a signal quality metric from the reference signal. The signal quality estimator 304 may first remove the effect of modulation of the known reference signal from the received reference signal. In an embodiment, the signal quality estimator may also remove interference from the received reference signal to obtain a signal comprising the reference signal, residual interference and noise. Then, the signal quality estimator may estimate a signal power of the reference signal according to any signal power estimation method known in the art. For example, the signal quality estimator 304 may compute a squared magnitude of the received reference signal. When the signal quality estimator knows the transmission power of the reference signal in the primary system transmitter, it may also utilize a path loss in the signal quality estimation, i.e. it is possible to compute an attenuation factor for the radio channel. In another embodiment, the signal quality estimator 304 estimates a noise power or a combined noise-plus-interference power and, thus obtains as the signal quality metric a signal-to-noise ratio (SNR) or a signal-to-noise-plus-interference ratio (SINR) for the received reference signal.

The signal quality estimator 304 may estimate interference the transmission in the secondary system with the beamforming setting used by the beamformer 310 causes towards the primary system from the signal quality metric (optionally modified with the path loss). The path loss may be used to scale the interference, i.e. to determine a reception signal power in the primary system transmitter if the apparatus transmitted in the secondary system with a given transmission power. So determined interference estimate is then compared with the threshold value. The comparison may be made by a scheduler 306 on the basis of the signal quality metric received from the signal quality estimator. The signal quality estimator may also indicate a radio resource, e.g. a frequency channel, to which a particular signal quality metric relates. If the interference is determined to be higher than the threshold, i.e. the estimated signal power, SNR or SINR is above the threshold, the scheduler 306 stops the procedure and waits for reception of another signal quality metric associated with a different beamform setting. On the other hand, if the interference is determined to be lower than the threshold, i.e. the estimated signal power, SNR or SINR is below the threshold, the scheduler determines that there is a transmission opportunity. The scheduler 306 then determines the radio resource available for scheduling and configures a transmission circuitry of the apparatus to cause transmission in the scheduled radio resource to another wireless communication device in the secondary system. The scheduling decision may also depend on the estimated signal quality to the targeted secondary receiver, as will be described in greater detail below. The quality or path-loss between secondary devices may be determined similarly using reference or pilot signals. Generally, the secondary transmitter is scheduled to transmit in a time slot or on a sub-channel, where the signal power to target receiver is sufficiently high and the interference to one or more (primary) receivers sufficiently low.

With respect to the transmission, upon reception of a scheduling command from the scheduler 306, a portion of buffered data is obtained from a transmission data buffer 308 and processed for transmission including modulation, channel coding, etc. (not shown). The processed data signal is then applied to a transmission beamformer 312 configured to obtain a multiple copies of the transmission signal and modify each copy with a modification factor according to Equation (2) so as to implement beamforming. The beamforming setting is the same as that used in the beamformer 310 described above in connection with the signal quality estimation which eventually triggered the transmission. When the transmission signal (or its multiple copies) is beamformed, the signals are applied to different branches in a coherent manner for transmission from different antennas simultaneously to implement a radiation pattern according to the beamforming setting. Each transmission signal copy is converted into an analog form in digital-to-analog converters 320, 322, and processed in analog transmission circuitries 328, 330 (including amplification, analog filtering, and frequency conversion). Outputs of the analog transmission circuitries are applied to the antennas to effect the transmission. The antennas used in the transmission and the reception may be the same physical antenna elements.

Components 304 to 314 may be realized by one or more processors 302 configured by one or more computer program modules. The computer program modules may be stored in a memory unit 300. The memory 300 may also store the data buffer 308, the above-mentioned threshold value(s) used by the signal quality estimator 304, the beamforming settings for use in the random beamforming by the beamform selector 314, and optionally other communication parameters.

In an embodiment, the apparatus comprises at least one processor 302 and at least one memory 300 including a computer program code, wherein the at least one memory and the computer program code are configured, with the at least one processor, to cause the apparatus to perform the method as described above with reference to FIG. 2.

In FIG. 3, the beamforming is made in the digital domain. FIG. 4 illustrates an embodiment where the beamforming is made in the analog domain. In this embodiment, the beamform selector 408 may select the beamform settings as described above and apply a corresponding signal indicating the selected beamform setting to the beamformers 406, 410. The signal may still be a digital signal which selects an analog circuitry for the beamformers. The different circuitries may be selected by adjusting parameters of amplifiers and/or filter circuitries in the beamformers 406, 410. In stead of multiplying the received signal with the modification factor of Equation (2), the beamforming is applied by amplifying and delaying the signals according to the selected beamform setting. Again, the beamform selector 408 may change the beamform setting between consecutive time slots, sub-frames, and/or frames. In the analog domain, an analog Butler matrix may be used to define the beamforming settings in a similar manner as described above in connection with the unitary matrices. Obviously, as the beamformers operate in the analog domain the A/D converter 402 is located in the receiver chain after the reception beamformer 406, while the ND converter 404 is located in the transmitter chain before the transmission beamformer 410. The functionality of the signal quality estimator 304 and the scheduler 306, and the data buffer 308 may be similar to that described above with reference to FIG. 3. Now, at least the signal quality estimator 304 and the scheduler 306 (and optionally the beamform selector 408) may be realized by said one or more digital signal processors.

Above, the adjustment of the amplitude and/or phase parameters according to a beamforming setting determined arbitrarily according to a given pattern have been described as beamforming setting parameters. In principle, the beamforming may be implemented such that the beamforming settings comprise at least one of the following: joint phase and amplitude adjustment as described above, only phase or amplitude adjustment as described above, reception antenna selection which may be arbitrary (e.g. in a determined order), and beam selection by using parameterized array.

Figure 5A:
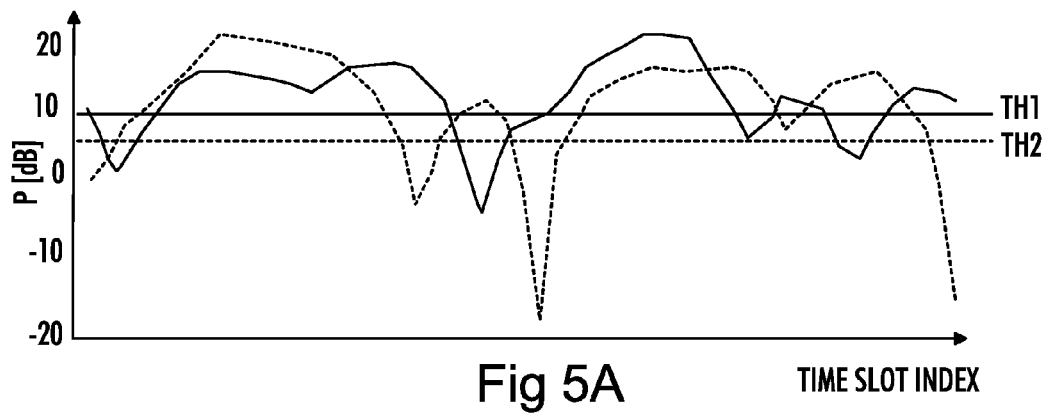
FIGS. 5A and 5B illustrate scheduling criteria according to embodiments of the invention.

In an embodiment, the apparatus also receives channel state information from the other communication device of the secondary system with which the apparatus communicates. The channel state information is exchanged or estimated to ensure that the transmission is carried out in radio resources that are suitable for reliable data transfer, i.e. when the channel quality is sufficiently high. The implementation of the exchange of the channel state information may be carried out according to any method known in the art. Channel reciprocity may be used to determine channel quality in manner similar to what was earlier described in connection with a primary system. Alternatively, or additionally, the other wireless communication device may, for example, transmit periodically channel quality indicators derived from reference signals transmitted by the transmission circuitry of the apparatus. The channel quality indicator is typically proportional to the signal power (or SNR or SINR) with which the other wireless communication device receives the reference signal from the transmitter apparatus of FIG. 3 or 4. FIG. 5A illustrates as a solid line such a channel quality indicator received in the apparatus according to an embodiment. The higher is the value of the channel quality indicator, the better is the channel between the two wireless communication devices of the secondary system. FIG. 5A illustrates also the signal quality metric computed from the signal received from the primary system transmitter, and this signal quality metric is illustrated as a dashed line. The lower is the value of the signal quality metric, the lower is the interference the transmission in the secondary system causes towards the primary system transmitter. FIG. 5A illustrates the two channel quality metrics for the same radio resource, and a similar graph may be provided for a plurality of radio resources, for example, when both primary and secondary system may utilize a plurality of same frequency channels. FIG. 5A illustrates also two thresholds, one for each signal quality metric. The scheduler 306 may evaluate the received signal quality metrics with the thresholds so as to determine whether or not there is a transmission opportunity to the other wireless communication device of the secondary system. When determining the transmission opportunity, the scheduler 306 may first evaluate the most recent channel quality indicator received from the other wireless communication device of the secondary system by comparing the value of the channel quality indicator with a first threshold (TH1). If the channel quality indicator is below the threshold, the scheduler 306 may determine that there is no transmission opportunity and prevent the scheduling. On the other hand, if the channel quality indicator is above the threshold TH1, the scheduler 306 may determine that there is a transmission opportunity in the link of the secondary system and proceed to evaluate the signal quality metric related to the primary system. In this evaluation, the scheduler 306 compares the signal quality metric computed from the signal received from the primary system transmitter with a second threshold (TH2 in FIG. 5A). If the signal quality indicator is above the threshold, the scheduler 306 may determine that there is no transmission opportunity and prevent the scheduling. On the other hand, if the signal quality indicator is below the threshold TH2, the scheduler 306 may determine that there is a transmission opportunity, i.e. the interference towards the primary system is sufficiently low, and carries out the scheduling.

Figure 5B:
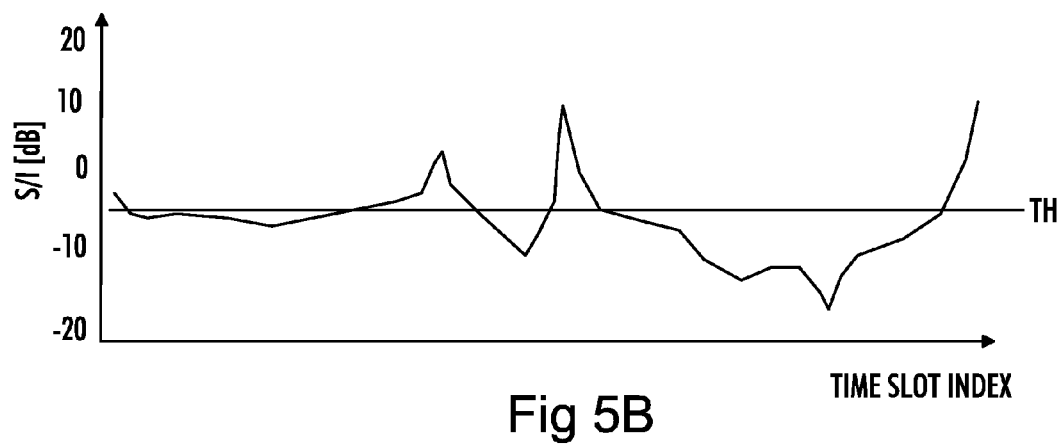

FIG. 5B illustrates another embodiment where the channel quality metrics of FIG. 5A are combined into a single signal quality metric by computing a difference or a ratio between the two channel quality metrics of FIG. 5A. An advantage in this embodiment is that only a single comparison with a single threshold may be made. In this embodiment, the signal quality estimator may combine the two channel quality metrics by deriving the difference between the two channel quality metrics. In more detail, both metrics may be in the same form, e.g. in the form of signal powers. The signal quality estimator may then subtract the signal power obtained for the primary system from the signal power obtained for the secondary system. Then, the scheduler may compare the difference with a single threshold. If the difference is higher than the threshold, the scheduler may determine that there is a transmission opportunity and carry out the scheduling. On the other hand, if the difference is lower than the threshold, the scheduler 306 may determine that there is no transmission opportunity and prevent the scheduling. The thresholds may also be variable and computed as dependent on the channel quality. For example, a running mean of the channel quality metric may be continuously computed for primary and/or secondary system, and the running mean may be used as the threshold. The first threshold may be computed as the running mean from the channel quality indicators previously received from the wireless communication device of the secondary system, while the second threshold may be computed as the running mean from the signal quality metrics computed from the reference signals previously received from the primary system transmitter. In practice, any known scheduling mechanism may be used, e.g. proportional fair scheduling based on the above-mentioned channel quality metrics.

In an embodiment where the combined signal quality metric is based on the difference, the combined signal quality metric may be calculated as:

$$SQI=S_{sec}[t]-\lambda I[t], \quad (4)$$

where $SNR_{sec}$ represents the channel quality (received signal power) in the link of the secondary system, I represents the interference towards the primary system, and $\lambda$ is a coefficient that may be unique for each primary system transmitter and be signaled from the primary system to the secondary system or determined at the secondary system. The coefficient $\lambda$ may be higher for those primary system devices that tolerate less interference and vice versa. For example, a base station of the primary system connected to mains may be provided with more sensitive reception circuitry that tolerates interference well and, thus, the coefficient $\lambda$ may be high for such a device. On the other hand, a mobile device with less sensitive receiver may be assigned with high coefficient $\lambda$. The apparatus according to an embodiment of the invention may determine the coefficient upon identifying the type of the primary system transmitter from signaling information received from the primary system transmitter. In another embodiment where the combined signal quality metric is based on the ratio, the combined signal quality metric may be calculated according to the following equation:

$$SQI = \frac{S_{sec}[t]}{\lambda I[t]}. \quad (5)$$

In summary, embodiments of the present invention vary the beamforming settings in the time and/or frequency domain, check for each beamforming setting whether or not the current beamforming setting interferes with the primary system. Upon detection of interference below the threshold, the transmission with the current beamforming setting is scheduled, provided that the channel quality in the secondary system is high enough. In other words, it is checked from a pilot signal received over a first link whether or not the current beamforming setting interferes the primary system and, if the interference is below the threshold, a second link is scheduled for transmission with the same beamforming setting. As mentioned above, the embodiments assume that the channel is reciprocal, i.e. the reception signal power related to a signal received from the primary system is proportional to the interference the transmission in the secondary system causes towards the primary system in the same radio resource. When the primary system uses time-division duplexing (TDD), the reciprocity criterion is inherently satisfied. When the primary system uses frequency-division duplexing (FDD), the reciprocity criterion may not be completely satisfied, because the primary system uses a different frequency for reception than that used in the interference estimation (transmit frequency). However, the interference estimate will still correlate with the actual interference, since the path-loss and structural channel (scattering points in a physical channel) aspects are often very similar in both duplex directions, and various embodiments of the present invention provides an improvement in the spectral efficiency. When the primary system uses the FDD, the interference may be estimated accurately in the reception frequency (or frequencies) in another manner, e.g. using bidirectional signaling between the wireless communication devices of the primary and secondary systems. The wireless communication device of the secondary system may transmit the reference signal to the wireless communication device of the primary system for computation of the interference estimate which is then transmitted from the primary system to the wireless communication device of the secondary system.

The same procedure for estimating interference to the primary system may be computed for a plurality of primary system transmitters in parallel, and the transmission in the secondary system may be scheduled when the interference towards all the primary system transmitters is below the threshold level(s). The higher is the number of antennas in the antenna array of the wireless communication device according to embodiments of the invention, the better spatial resolution is obtained and the transmission opportunities occur more frequently. In an embodiment, the number of antennas in the antenna array is four. In another embodiment, the number of antennas in the antenna array is eight.

In an embodiment where the primary system transmitter also employs the random beamforming techniques, the primary system transmitter may be configured to indicate periodicity for the random beamforming, e.g. the number of different beamforming settings that are repeated cyclically. The periodicity may be comprised in control signals transmitted or broadcasted by the primary system transmitter. Upon reception of the periodicity information from the primary system transmitter, the wireless communication device according to an embodiment of the invention may adapt the periodicity of its own beamforming setting to the periodicity of the primary system transmitter, e.g. by setting the periodicity to be the same as the periodicity of the primary system transmitter. Now, the wireless communication device according to the embodiment may assume that the signal quality metric will not change significantly over one period (one round of different beamforming settings), and it may omit at least some of the computations of the signal quality metric for said primary system transmitter having the same periodicity for the beamforming settings. For example, the signal quality metric may be computed for every second (or every third) period of beamforming settings. In other words, it is not necessary to compute the signal quality metric for all beamforming setting in all beamforming setting periods. As a consequence, if a given signal quality metric with a given beamforming setting has triggered the scheduling in a given beamforming setting period, the scheduler is configured to schedule transmission with the same beamforming setting in the subsequent beamforming setting period automatically without analysis of another signal quality metric.

Figure 6:
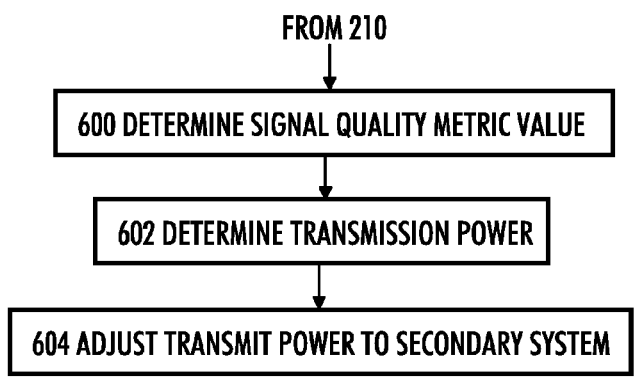
FIG. 6 is a flow diagram of a process for controlling transmission power according to an embodiment of the invention.

In an embodiment of the invention, the transmission power used in the scheduled transmission is proportional to the signal quality metric. The lower is the interference towards the primary system, the higher transmission power is used. FIG. 6 illustrates a procedure for controlling the transmission power according to the estimated interference towards the primary system. The process of FIG. 6 may be carried out in connection with the process of FIG. 2, wherein the steps of FIG. 6 are used in response to the execution of block 210. The steps of FIG. 6 may be executed in a transmission power control circuitry of the apparatus according to an embodiment. In block 600, the transmission power control circuitry determines a signal quality metric value computed by the signal quality estimator 304. The signal quality metric may be the same metric used as the scheduling criterion, or it may represent transmission power of the reference signal received from the primary system transmitter. In block 602, the transmission power is determined on the basis of the signal quality metric value received in block 600. The memory 300 may store a database comprising mappings between signal quality metric values and associated transmission powers. In block 602, the transmission power control circuitry may check the database for a transmission power linked to the signal quality metric value received in block 600. In block 604, the transmission power control circuitry adjusts the transmission power of a signal transmitted to the secondary system receiver according to the transmission power determined in block 602.

In an embodiment, the random beamforming is used in collaborative sensing where a group of wireless communication devices of the secondary system collaboratively sense the presence of the primary system transmitters (or more generally primary system communication devices). Upon detection of the primary system transmitter, the other secondary devices in the group are notified about the detection of the presence of the primary system transmitter. The notification may be a control message transmitted to the other devices in the group, and the control message may also carry information on a radio resource, e.g. a frequency channel index, where the primary system transmitter was detected. In another embodiment, the notification is only a one-bit flag notifying about the detected presence or absence of the primary system transmitter. Upon reception of the notification (or upon detection) of the presence of the primary system transmitter, a wireless communication device of the secondary system may primarily schedule radio resources not occupied by the primary system transmitter, i.e. first attempt to schedule transmissions to those radio resources and, if no scheduling opportunity is found in those radio resources, then schedule radio resources used by the primary system, if the interference the current random beamforming setting causes towards the primary system is below the above-mentioned threshold(s).

As used in this application, the term 'circuitry' refers to at least one of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory or memories that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor, e.g. one or more cores of the processor, and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in connection with FIGS. 2 to 6 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless telecommunication systems defined above but also to other suitable wireless telecommunication systems. The protocols used, the specifications of wireless telecommunication systems, their network elements and subscriber terminals, develop rapidly. Such a development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
   receiving, in a wireless communication apparatus, a reference signal from a transmitter of a primary system through a radio channel in a radio communication resource;
   applying an arbitrarily selected reception beamforming setting to the received signal, wherein the arbitrarily selected beamforming setting is selected arbitrarily from a set comprising at least two beamforming settings;
   estimating a signal quality metric from the received signal to which the selected reception beamforming setting has been applied;
   scheduling transmission of a data signal in said radio communication resource to a wireless communication device of a secondary system with a transmission beamforming setting having the same beamforming parameters as the reception beamforming setting, wherein the scheduling is triggered when the estimated signal quality metric indicates a signal quality lower than a determined threshold.

2. The method of claim 1, wherein said reception beamforming setting is selected without information on channel conditions between the wireless communication apparatus and the transmitter of the primary system.

3. The method of claim 1, further comprising:
   changing the arbitrary reception beamforming setting between time slots in which signals from the transmitter of the primary system are received.

4. The method of claim 1, wherein a set of arbitrary reception beamforming settings is repeated in a cyclic manner.

5. The method of claim 1, wherein the signal quality metric estimated from the signal received from the transmitter of the primary system is a first signal quality metric and wherein said threshold is a first threshold, the method further comprising:
   receiving a second signal from the wireless communication device of the secondary system;
   estimating a second signal quality metric from said second signal; and scheduling the transmission of the signal to the wireless communication device of the secondary system if the first signal quality metric indicates a signal quality lower than the first threshold and if the second signal quality metric indicates a signal quality higher than a determined second threshold.

6. The method of claim 1, wherein the signal quality metric estimated from the signal received from the transmitter of the primary system is a first signal quality metric, the method further comprising:
receiving a second signal from the wireless communication device of the secondary system;
estimating a second signal quality metric from said second signal;
combining the first signal quality metric and the second signal quality metric into a single signal quality metric;
comparing the combined signal quality metric with said threshold; and
scheduling the transmission of the signal to the wireless communication device of the secondary system if the combined signal quality metric is in a determined range with respect to the threshold.

7. The method of claim 1, wherein said signal quality metrics are estimated reception signal power values, and wherein the reception signal power estimated from the signal received from the transmitter of the primary system is considered to be proportional to interference the wireless communication apparatus causes towards the transmitter of the primary system.

8. The method of claim 1, further comprising: adjusting transmission power of the scheduled transmission to the wireless communication device of the secondary system in proportion to the signal quality metric estimated from the signal received from the transmitter of the primary system.

9. The method of claim 1, wherein the arbitrary selection of the beamforming setting comprises selecting from a codebook of beamforming settings sequentially or randomly a beamforming setting to be applied to the received signal.

10. An apparatus comprising:
at least one processor; and
at least one memory including a computer program code, wherein the at least one memory and the computer program code are configured, with the at least one processor, to cause the apparatus to receive a reference signal from a transmitter of a primary system through a radio channel, wherein the signal is associated to a radio communication resource, to apply an arbitrarily selected reception beamforming setting to the received signal, wherein the arbitrarily selected beamforming setting is selected arbitrarily from a set comprising at least two beamforming settings, to estimate a signal quality metric from the received signal to which the arbitrarily selected reception beamforming setting has been applied, and to schedule transmission of a data signal in said radio communication resource to a wireless communication device of a secondary system with a transmission beamforming setting having the same beamforming parameters as the reception beamforming setting, wherein the scheduling is triggered when the estimated signal quality metric indicates a signal quality lower than a determined threshold.

11. The apparatus of claim 10, wherein the at least one memory and the computer program code are configured, with the at least one processor, to cause the apparatus to select the reception beamforming setting without information on channel conditions between the wireless communication apparatus and the transmitter of the primary system.

12. The apparatus of claim 10, wherein the at least one memory and the computer program code are configured, with the at least one processor, to cause the apparatus to change the arbitrary reception beamforming setting between time slots in which signals from the transmitter of the primary system are received.

13. The apparatus of claim 10, wherein a set of arbitrary reception beamforming settings is repeated in a cyclic manner.

14. The apparatus of claim 10, wherein the signal quality metric estimated from the signal received from the transmitter of the primary system is a first signal quality metric, wherein said threshold is a first threshold, and wherein the at least one memory and the computer program code are configured, with the at least one processor, to cause the apparatus to receive a second signal from the wireless communication device of the secondary system, to estimate a second signal quality metric from said second signal, and to schedule the transmission of the signal to the wireless communication device of the secondary system if the first signal quality metric indicates a signal quality lower than the first threshold and if the second signal quality metric indicates a signal quality higher than a determined second threshold.

15. The apparatus of claim 10, wherein the signal quality metric estimated from the signal received from the transmitter of the primary system is a first signal quality metric, and wherein the at least one memory and the computer program code are configured, with the at least one processor, to cause the apparatus to receive a second signal from the wireless communication device of the secondary system, to estimate a second signal quality metric from said second signal, to combine the first signal quality metric and the second signal quality metric into a single signal quality metric, to compare the combined signal quality metric with said threshold, and to schedule the transmission of the signal to the wireless communication device of the secondary system if the combined signal quality metric is in a determined range with respect to the threshold.

16. The apparatus of claim 10, wherein the at least one memory and the computer program code are configured, with the at least one processor, to cause the apparatus to estimate said signal quality metrics as reception signal power values, and to consider the reception signal power estimated from the signal received from the transmitter of the primary system to be proportional to interference the apparatus causes towards the transmitter of the primary system with said beamforming setting.

17. The apparatus of claim 10, wherein the at least one memory and the computer program code are configured, with the at least one processor, to cause the apparatus to adjust transmission power of the scheduled transmission to the wireless communication device of the secondary system in proportion to the signal quality metric estimated from the signal received from the transmitter of the primary system.

18. The apparatus of claim 10, wherein the apparatus is a wireless communication device and further comprises a user interface for outputting data received through the radio channel from at least one of the transmitter of the primary system and the wireless communication device of the secondary system.

19. The apparatus of claim 10, wherein the at least one memory and the computer program code are configured, with the at least one processor, to cause the apparatus to carry out the arbitrary selection of the beamforming setting by selecting from a codebook of beamforming settings sequentially or randomly a beamforming setting to be applied to the received signal.

20. A computer program product embodied on a non-transitory distribution medium readable by a computer and comprising program instructions which, when loaded into an apparatus, execute a computer process comprising:
- receiving a reference signal from a transmitter of a primary system through a radio channel in a radio communication resource;
- applying an arbitrarily selected reception beamforming setting to the received signal, wherein the arbitrarily selected beamforming setting is selected arbitrarily from a set comprising at least two beamforming settings;
- estimating a signal quality metric from the received signal to which the selected reception beamforming setting has been applied;
- scheduling transmission of a data signal in said radio communication resource to a wireless communication device of a secondary system with a transmission beamforming setting having the same beamforming parameters as the reception beamforming setting, wherein the scheduling is triggered when the estimated signal quality metric indicates a signal quality lower than a determined threshold.

* * * * *